(12) United States Patent
Wall, III et al.

(10) Patent No.: US 8,060,997 B2
(45) Date of Patent: Nov. 22, 2011

(54) LOW Z PREFORM

(75) Inventors: John W. Wall, III, Troy, OH (US);
Robert A. Fiala, Spokane, WA (US);
Jesse F. Delanoy, Spokane, WA (US)

(73) Assignee: Goodrich Corporation, Charlotte, NC (US)

(*) Notice: Subject to any disclaimer, the term of this patent is extended or adjusted under 35 U.S.C. 154(b) by 497 days.

(21) Appl. No.: 12/397,685

(22) Filed: Mar. 4, 2009

(65) Prior Publication Data
US 2010/0223766 A1    Sep. 9, 2010

(51) Int. Cl.
*D04H 3/05* (2006.01)
*D04H 3/10* (2006.01)

(52) U.S. Cl. .......................................... 28/107; 28/111

(58) Field of Classification Search ............ 28/107, 28/111, 108–110, 112–115, 101, 102, 143; 264/29.1, 29.2, 29.5; 156/177–179, 181, 156/148
See application file for complete search history.

(56) References Cited

U.S. PATENT DOCUMENTS

| | | | | |
|---|---|---|---|---|
| 3,971,669 A | * | 7/1976 | Wrzesien et al. | 156/181 |
| 3,994,762 A | * | 11/1976 | Wrzesien et al. | 156/148 |
| 4,416,936 A | * | 11/1983 | Erickson et al. | 442/405 |
| 5,084,332 A | * | 1/1992 | Burgess | 428/219 |
| 5,184,387 A | * | 2/1993 | Lawton et al. | 29/419.1 |
| 5,283,113 A | * | 2/1994 | Nishimura et al. | 442/320 |
| 5,503,893 A | * | 4/1996 | Evans et al. | 428/110 |
| 5,504,979 A | * | 4/1996 | Sheehan et al. | 28/113 |
| 5,515,585 A | * | 5/1996 | Sheehan et al. | 28/104 |
| 6,237,203 B1 | * | 5/2001 | Sheehan et al. | 28/140 |
| 6,585,842 B1 | * | 7/2003 | Bompard et al. | 156/166 |
| 2005/0205213 A1 | * | 9/2005 | Bompard et al. | 156/439 |

* cited by examiner

*Primary Examiner* — Amy Vanatta
(74) *Attorney, Agent, or Firm* — Snell & Wilmer L.L.P.

(57) ABSTRACT

A method for forming a fibrous three dimensional structure comprises providing a first fibrous layer, wherein the first fibrous layer is aligned in the machine direction. At least one additional fibrous layer is superposed with the first fibrous layer, wherein the direction of alignment of the at least one additional fibrous layer is at an acute angle to the machine direction. The first fibrous layer and the at least one additional fibrous layer are needled together at a needle density of greater than approximately 55 needle punches per square centimeter, forming a first combined fibrous mat. The combined fibrous mat is superposed with at least one additional combined fibrous mat and needled at a needle density of less than approximately 60 needle punches per square centimeter, forming a fibrous three dimensional structure.

19 Claims, 7 Drawing Sheets

LOW Z PREFORM

TECHNICAL FIELD

The present description relates generally to the manufacture of composite materials and parts. More particularly, the invention relates to a method and system for fabricating an ultra low z carbon preform.

BACKGROUND

Carbon/carbon parts are employed in various industries. One use for carbon/carbon parts is in the form of friction disks such as aircraft brake disks, helicopter rotor brakes, lift fan clutches, and race car brake and clutch disks. Carbon/carbon brake disks are especially useful in such applications because of the superior high temperature characteristics of C/C material. In particular, carbon/carbon material is a good conductor of heat and is able to dissipate heat generated during braking, away from the friction surfaces. Carbon/carbon material is also highly resistant to heat damage, and is thus capable of sustaining friction between brake surfaces during severe braking without a significant reduction in the friction coefficient or mechanical failure.

Carbon/carbon material is commonly formed by utilizing continuous oxidized polyacrylonitrile (PAN) fibers, referred to as "OPF" fibers. These OPF fibers are the precursors of carbon fibers and are used to fabricate a preformed shape composed of multiple layers. Typically, two or more layers are positioned onto a support plate and then needled together simultaneously or in a series of needling steps. During the needling process, multiple barbed needles are driven into the fibrous layers to displace a portion of the horizontal fibers into the z-direction. This action interconnects horizontal fiber layers into a multilayer board. Transport of the fibers by the barbed needles is a function of the stiffness and degree of freedom of the fibers, as well as other parameters. The polymeric nature of the OPF fibers allows transport of the low modulus fibers in the z-direction.

After the needling process is complete, the OPF fibers must be carbonized at high temperatures in a controlled environment to transform the preform into a high carbon content substrate. During the carbonization process, the preform loses approximately 50% of its mass and experiences a net increase in fiber density. Following this batch operation, the resulting fibrous carbon substrate is densified through chemical vapor deposition (CVD) of pyrolytic carbon until the composite reaches the target density level.

Controlling the speed of the needling process and the amount and distribution of z-fibers is an important step in the production of a preform. A higher volume of z-fibers within the preform prevents delamination in subsequent processing. A method for decreasing the amount of displaced fibers into the z-direction and obtaining higher volumes of carbon fibers within the composite without sacrificing overall composite characteristics is desired.

BRIEF SUMMARY

A method for forming a fibrous three dimensional structure via needle punching is described. The method comprises providing a first fibrous layer, wherein the first fibrous layer is aligned in the machine direction. The method further comprises superposing at least one additional fibrous layer with the first fibrous layer, wherein the direction of alignment of the at least one additional fibrous layer is at an acute angle to the machine direction. The method further comprises needling the first fibrous layer and the at least one additional fibrous layer together at a needle density of greater than approximately 55 needle punches per square centimeter, forming a first combined fibrous mat. The method further comprises superposing at least one additional combined fibrous mat with the first combined fibrous mat. The method further comprises needling the first combined fibrous mat and the at least one additional fibrous mat at a needle density of less than approximately 60 needle punches per square centimeter, forming a fibrous three dimensional structure.

BRIEF DESCRIPTION OF THE DRAWINGS

The fibrous three dimensional structure may be better understood with reference to the following drawings and description. Non-limiting and non-exhaustive descriptions are described with reference to the following drawings. The components in the figures are not necessarily to scale, with emphasis instead being placed upon illustrating principles. In the figures, like referenced numerals may refer to like parts throughout the different figures unless otherwise specified.

DETAILED DESCRIPTION

Fibrous preform structures are suitable for subsequent processing in which a binding matrix is deposited within the preform structure, thus forming a composite structure. The fibrous preform structures may be suitable for subsequent processing into carbon/carbon structures such as aircraft brake disks. Subsequent processing traditionally involves pyrolyzing the preform structure (if it is formed from a precursor material), and depositing a binding carbon matrix. Depositing the carbon matrix within the preform structure may be accomplished according to known techniques such as chemical vapor infiltration and chemical vapor deposition (CVI/CVD), or by repeatedly impregnating the substrate with a carbon bearing pitch or resin which is subsequently charred, or by any equivalent process. The methods are not directed to forming the binding matrix or densification of the fibrous preform structure, as these techniques are known in the art. Though described in relation to carbon/carbon composites, it is contemplated that the methods may be used with equal utility for forming fibrous preform structures suitable for subsequent processing into ceramic composite structures and carbon/ceramic composite structures.

Figure 1:
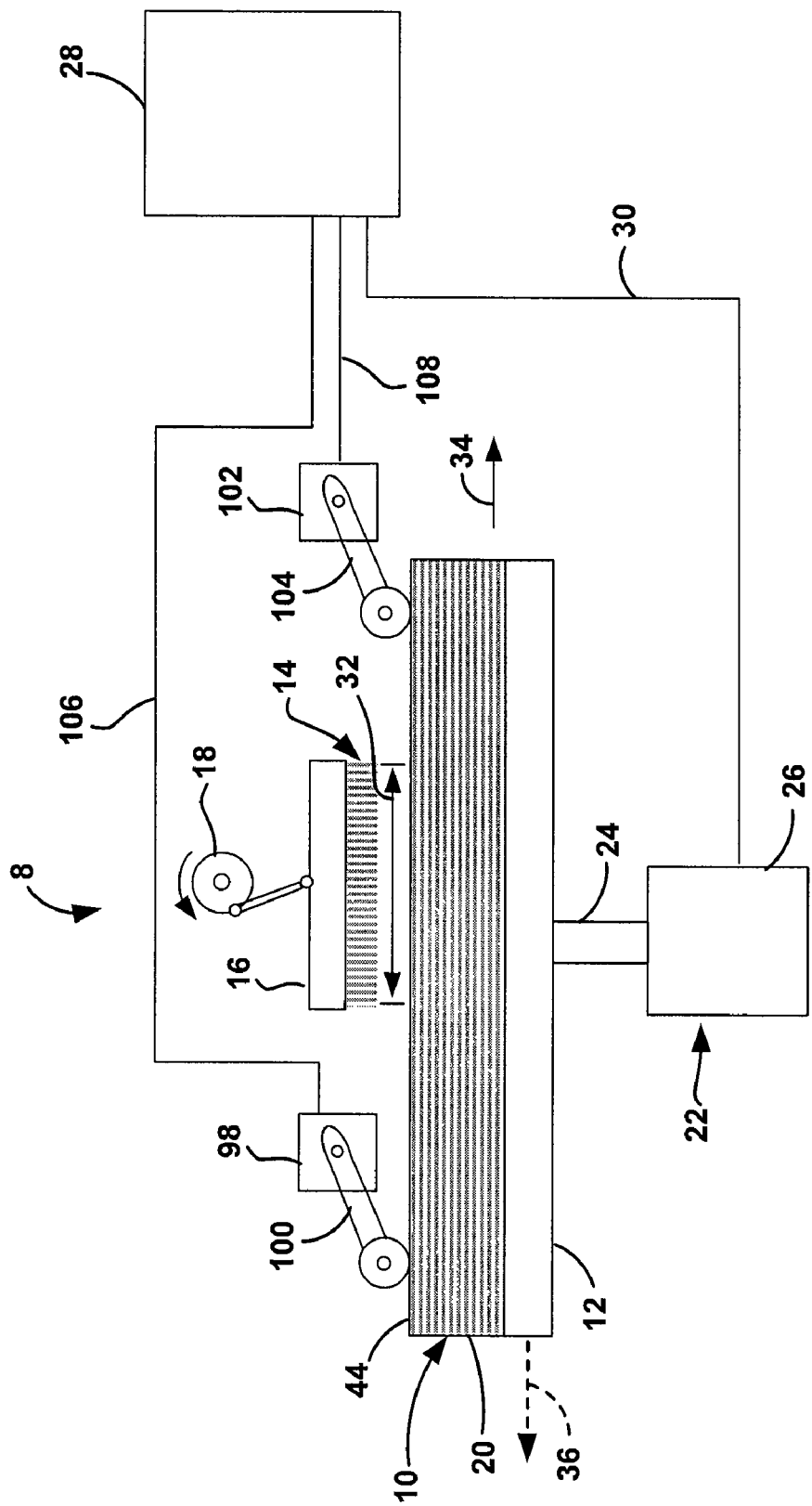
FIG. 1 illustrates a general schematic arrangement of a needling apparatus suitable for use with the invention.

Various aspects are described as follows in relation to FIGS. 1 through 8 wherein like numbered components are equivalent. Referring specifically to FIG. 1, a needling apparatus 8 is schematically depicted. Apparatus 8 is suitable for forming a fibrous preform structure by joining several fibrous layers together beginning with at least two fibrous layers to which additional fibrous layers are added in a series of needling passes.

Examples of apparatuses suitable for use are described in U.S. Pat. No. 4,790,052 to Olry (hereinafter the '052 patent); U.S. Pat. No. 4,955,123 to Lawton et al. (hereinafter the '123 patent); and U.S. Pat. No. 5,217,770 to Morris, Jr. et al. (hereinafter the '770 patent), each of which is hereby incorporated by reference. FIG. 1 is intended to present only a general illustration of a needling zone of any such apparatus. Thus, embodiments are adaptable for use with an apparatus for forming a sheet or "board" as described in the '052 patent, or for forming an annulus as described in the '123 and '770 patents. Additionally, any variation in shape of the fibrous preform structure produced is acceptable.

Still referring to FIG. 1, a fibrous preform structure 20 is shown in the process of being formed in apparatus 8. The fibrous structure 20 is disposed on a support or bedplate 12 beneath a multitude of felting needles 14 mounted in a needle board 16. Support 12 is penetrable by the needles 14, and may be formed from a penetrable material such as foamed plastic or brush bristles, or an impenetrable material such as metal or plastic with holes aligned with the needles 14 to allow penetration. Fibrous structure 20 is comprised of fibrous layers with a top layer defining an exposed surface 44. The fibrous structure is then subjected to a needling pass in which the multitude of felting needles 14 are repeatedly driven into the fibrous structure 20 through exposed surface 44 as the fibrous structure 20 is passed beneath the felting needles in the direction of arrow 34. As used herein, the term "fibrous structure" refers to all the fibrous layers disposed on the support 12 beneath the felting needles 14 during a given needling pass. Layers may be added to the fibrous structure at one or more needling passes, but it is not necessary to add a fibrous layer to the fibrous structure at every needling pass.

The felting needles 14 are arranged in an array as is known in the art. Other types of needling devices or boards commonly known in the art are also acceptable. Several rows may be arranged parallel to each other so the entire width of the fibrous structure 20 may be subjected to needling with each needling pass. The array of felting needles 14 defines a needling zone 32.

The felting needles 14 are driven by means of a drive mechanism 18 that drives needle board 16 through a fixed range of travel in a reciprocating motion. The multitude of felting needles thereby displace fibers among layers of the fibrous structure 20 producing "Z-fiber" bundles that pass between layers generally perpendicular to the layer interfaces. Additional layers are disposed over previous layers and subjected to additional needling passes which adheres the additional layers to the previous layers. Additional layers are added until a final desired thickness is established. The fibrous structure 20 may then be subjected to further needling passes without adding additional layers. The finished fibrous perform structure 20 can be processed in subsequent operations, in known manner, as previously described.

A support adjustment mechanism 22 adjusts the support position relative to the multitude of felting needles 14 in a manner well known in the art. Here, the support adjustment mechanism comprises jackscrew 24 and motor/gearbox 26. A controller 28 controls the support adjustment mechanism 22 via control line 30 as necessary in order to precisely position the support 12 relative to the multitude of felting needles 14. The fibrous structure 20 may be driven by means of a conveyor in the direction of arrow 34 such that the multitude of felting needles may be repeatedly driven into the exposed surface 44 along the length of fibrous structure 20. The fibrous structure 20 and conveyor may be subsequently driven in the direction of arrow 36 thereby needling the fibrous preform structure in the opposite direction, as described in the '052 patent. The fibrous structure 20 and conveyor would normally be driven in only one direction if an annular shape is being formed as described in the '123 or '770 patents. Also, the fibrous structure 20 and conveyor may be continuously driven as the needles are driven into fibrous structure 20, or the fibrous structure 20 and conveyer may be synchronized with drive mechanism 18 such that the conveyor momentarily stops or travels in an elliptical path when the needles 14 are driven into fibrous structure 20. Any such variations are considered to be within the purview of the invention. Also, the various components of apparatus 8 may be oriented in various ways without departing from the invention. For example, apparatus 8 could be rotated onto a side or even inverted if a particular application necessitated such an arrangement.

Figure 2:
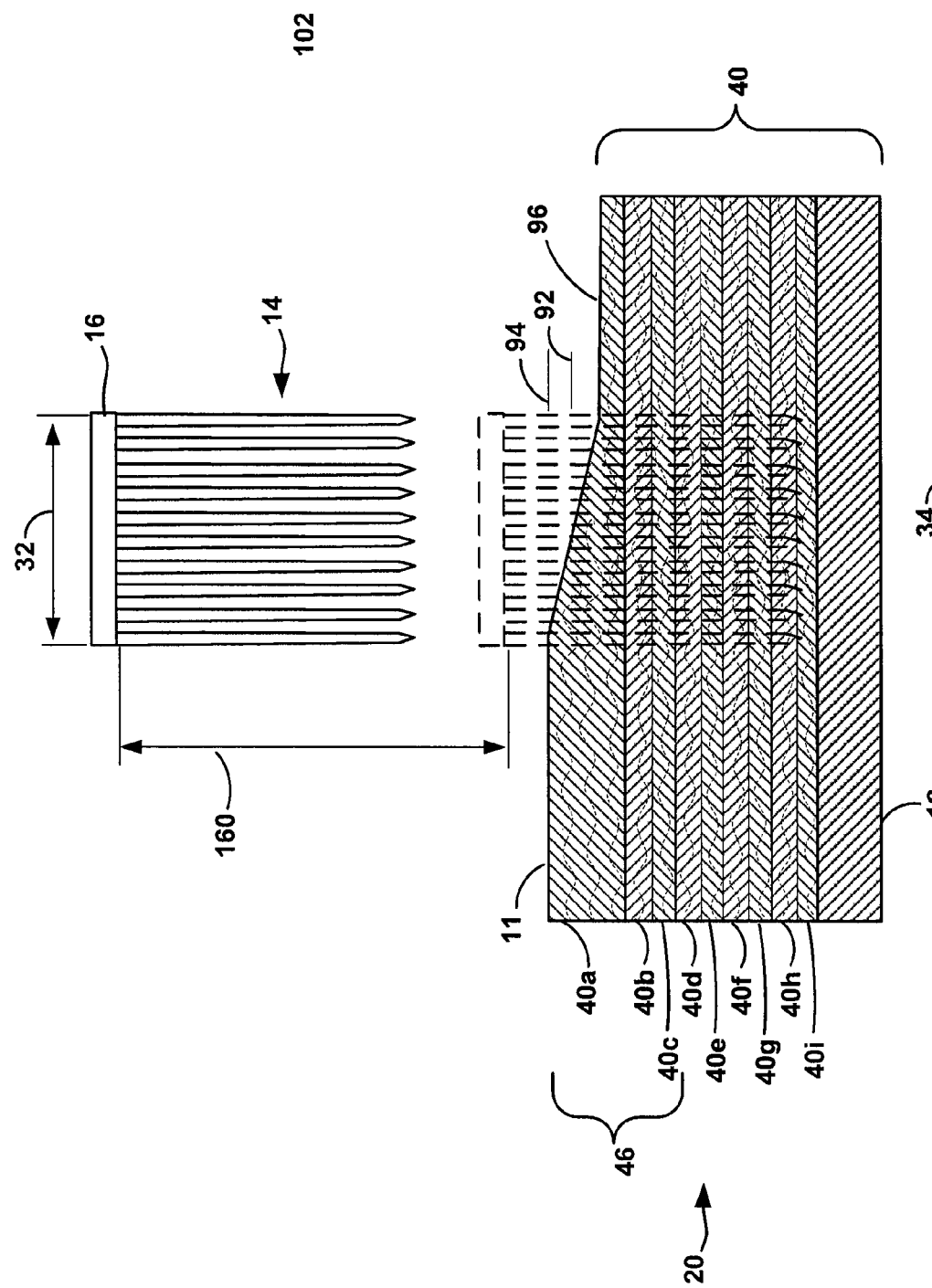
FIG. 2 depicts a detailed view of a needling process using the FIG. 1 apparatus.

As shown in FIG. 2, a fibrous structure 20 comprising at least two fibrous layers 40a-40i is disposed beneath the multitude of felting needles 14 on support 12. As depicted, the fibrous structure 20 may comprise a multitude of superposed layers. A top fibrous layer 40a is disposed over lower adjacent layers 40b, 40c, 40d, 40e, 40f, 40g, 40h, and 40i with the top layer 40a defining an exposed surface 44. In this example, top layer 40a is not adhered to layer 40b until it is subjected to a needling pass in which fibrous layers 40a-40i are passed beneath the multitude of felting needles 14 while the multitude of felting needles 14 are repeatedly driven through the exposed surface 44 into the fibrous structure, as shown in phantom, deep enough to permanently transport fiber from layer 40a into lower adjacent layer 40b. The needling pass adheres top layer 40a to layer 40b by permanently transporting fiber from the top layer 40a into layer 40b and other lower adjacent layers.

Fiber is permanently transported from a chosen set 46 of layers for each needling pass. The set of layers may change from one needling pass to the next. Choosing the set of layers is a matter of preform design according to desired final preform properties. The set of layers includes at least the top layer 40a. In one embodiment, the set of layers preferably includes the top layer 40a and at least one adjacent layer 40b. In other embodiment, the set of layers preferably includes the tp layer 40a and at least two adjacent layers 40b and 40c. In the example shown in layers could include more than three layers in many applications.

Figure 3:
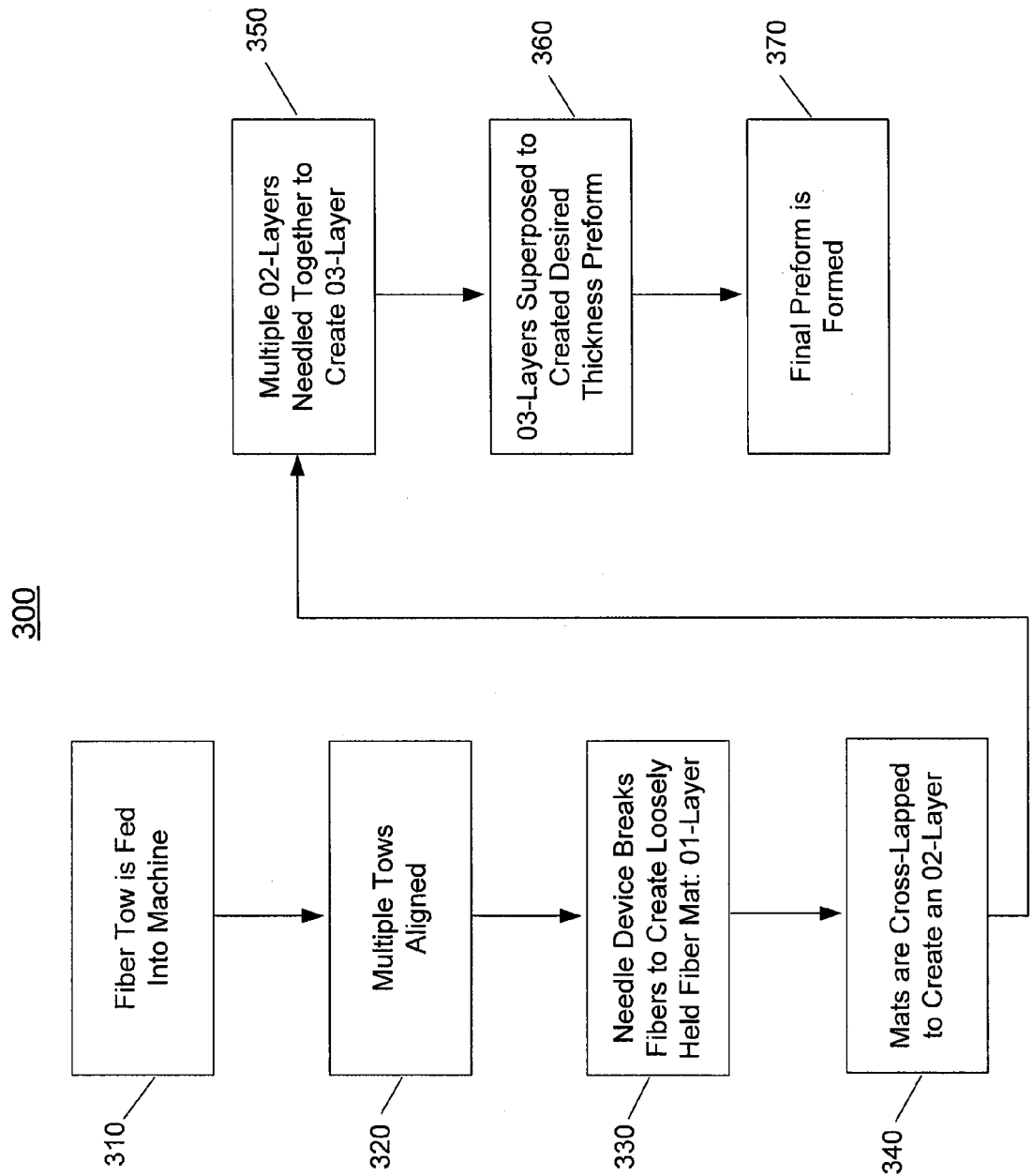
FIG. 3 illustrates a flow chart for a process suitable for use with the present invention.

A process flow chart 300 is depicted in FIG. 3, wherein the blocks of the flow chart 300 are further illustrated by processes in FIGS. 4-8. In block 310, a fiber tow of continuous filaments is utilized. At least one tow of fiber consisting of generally continuous filaments is fed into a fiber processing machine. Various fibers may be utilized for the process. For example, generally continuous, un-processed oxidized PAN fibers may be used. Such fibers consist of continuous fiber filaments that may be obtained commercially. A collection of such continuous fiber filaments is referred to as a "tow" and such a tow may have any number of filaments in it. In certain embodiments, one tow is comprised of approximately 24,000-400,000 continuous filaments. In another embodiment, one tow is comprised of approximately 320,000-400,000 continuous filaments.

Figure 4:
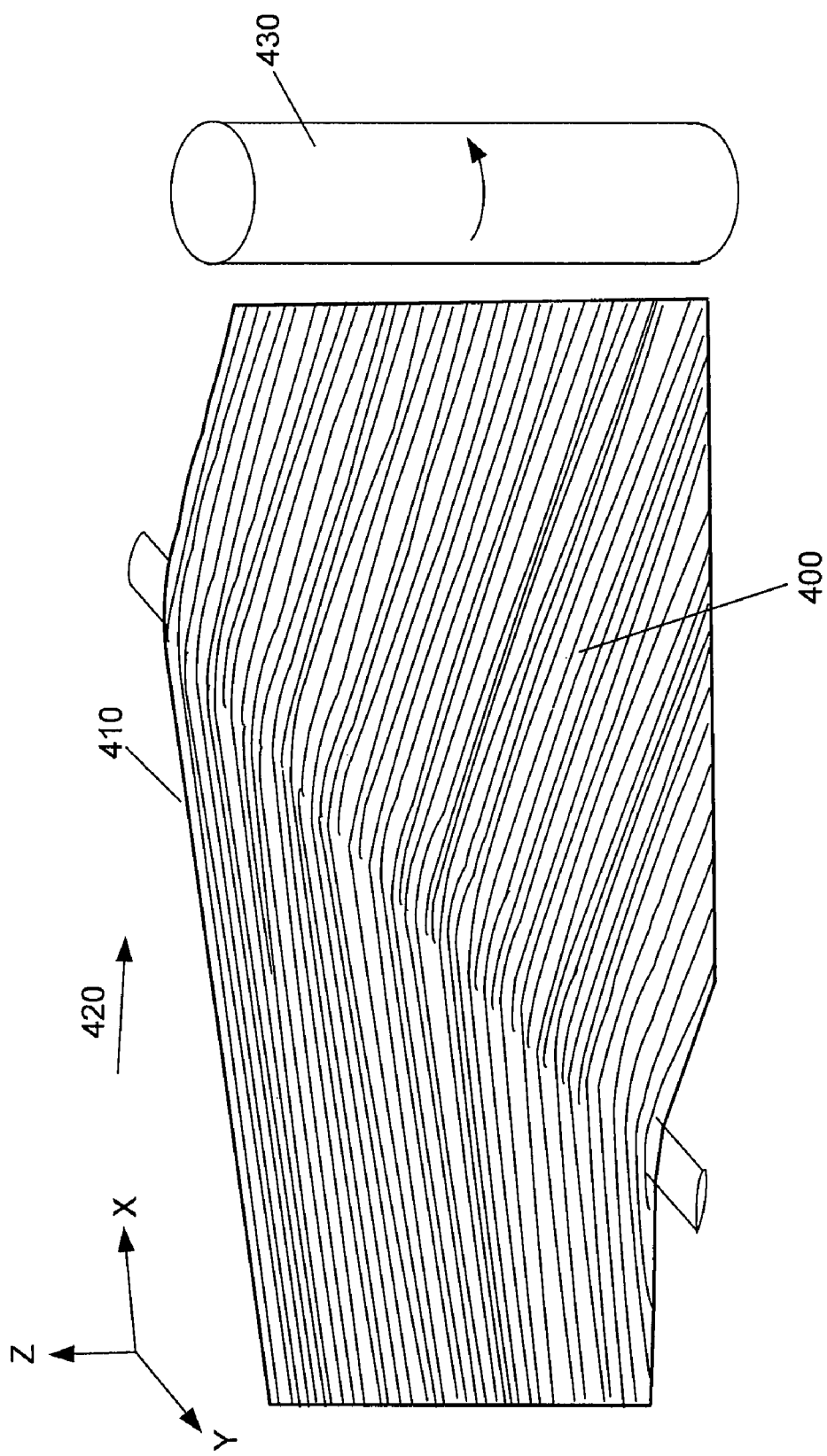
FIG. 4 illustrates a perspective view of a fiber tow suitable for use with the present invention.

In block 320, multiple tows are utilized to create a unidirectional sheet of fiber 400. As shown in FIG. 4, fiber bundles 410 are aligned in a common direction. In the preferred embodiment, the fibers 410 are aligned in the X direction, which is also a machine direction 420. The horizontal fiber bundles 410 may be disposed horizontally relative to one another and/or partially or wholly intertwined with one another in the machine direction 420. Alternatively, some of the fiber bundles 410 may be superposed on one another and aligned in the machine direction 420. Any number of tows 410 may be so aligned depending on the desired thickness and height of the sheet of fiber 400.

In certain embodiments, as shown at block 330, the aligned fiber bundles 410 may be processed by a first needling device. Alternatively, the fibrous layer may be held together through a number of commonly known mechanisms, such as adhesives.

The first needling device may be similar to a needling apparatus 8 described in FIG. 1. However, the first needling device utilized to needle the aligned fiber bundles 410 may be used to processes continuous fiber bundles. The first needling device may be disposed above the fibrous layer or sheet 400 as the fibrous layer 400 is moved in the machine direction 420. The first needling device may also be proximal to a bobbin to wrap and/or store fibrous layer 400 after needling.

The needles of the needling device, similar to needles 14, may break some of the fibers within the fiber bundles 410 to create a loosely held sheet of fiber 400 that appears as a unidirectional mat of fibers aligned in the machine direction 420. Such a mat may be referred to as a "01-roll-good" and such a needling process of the aligned fiber bundles 410 may be referred to as "01-processing". The amount of needles disposed on the first needling apparatus may be expressed as a needle density in needles per square centimeter. The first needling device may have any appropriate needle density as is known in the art.

After processing of the fiber bundles 410 into the unidirectional fibrous layer 400, the fibrous layer 400 may be stored for further processing. In a preferred embodiment, fibrous layer 400 is wrapped onto one or more transportation bobbins 430 for further processing. Bobbins 430 may be spiral, helical, cylindrical, or any other shape capable of allowing the fibrous layer 400 to be wound around it. Alternatively, the fibrous layer 400 may be stored as a layered tape wherein the tape is flat.

Figure 5:
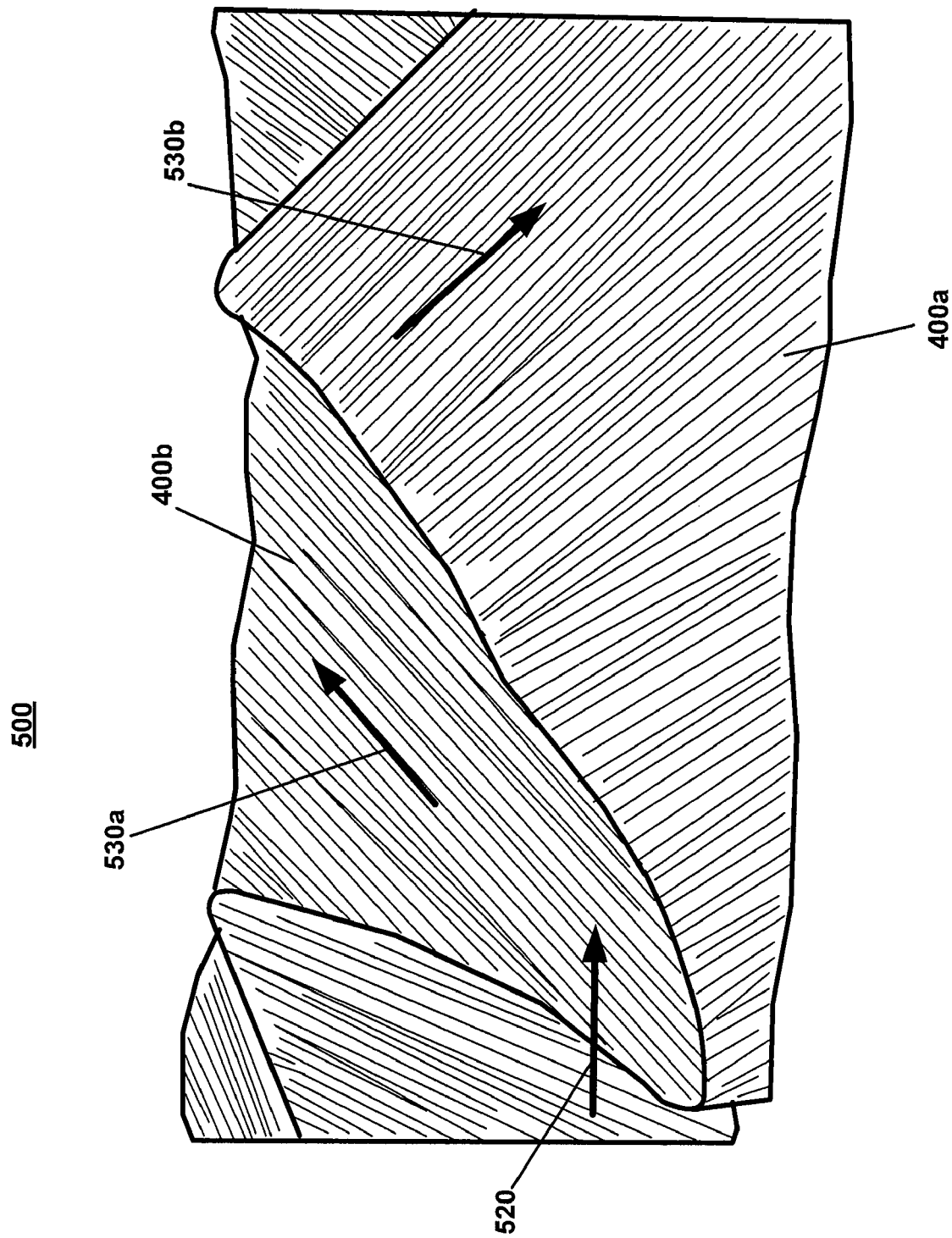
FIG. 5 illustrates a top view of several layers of fiber tows cross-lapped and superposed on one another.

At block 340, as illustrated in FIG. 5, one or more additional fibrous layers or mats are superposed at an angle with the first fibrous layer oriented in the machine direction 520. The fibrous layer 400 that is oriented in the machine direction is referred to as machine direction fiber mat or first fibrous layer 400a. The at least one additional fibrous layer 400 that is oriented at an angle to the machine direction and is superposed with the first fibrous layer 400a is referred to as a superposed fibrous layer 400b. Such superposition of fibers with machine direction fibers creates a layered fiber mat wherein the two or more fiber mats 400 have a different direction of alignment. In other embodiments, the at least one superposed fibrous layer 400b is laid down by one or more bobbins 430. In a preferred embodiment, the first fibrous layer 400a is placed in a machine direction 520.

The at least one additional, superposed fiber layer 400b may then be superposed on the machine direction fiber mat 400a and oriented at an angle to the first fibrous layer 400a. The angle of superposition of the at least one superposed fibrous layer 400b may be selected as necessary and changed to accommodate different fabrics, needling speeds, and final material requirements. The angle may also depend on the number of superposed fibrous layers 400b being superposed on the first fibrous layer 400a. Typically, the superposition angle is an acute angle between zero and 90 degrees. In certain embodiments, the angle for the superposition is between thirty and seventy degrees to the machine direction.

In certain embodiments, the at least one superposed fibrous layer 400b is superposed by cross-lapping the at least one additional superposed fibrous layer 400b with the first fibrous layer 400a. Cross-lapping, involves laying down one or more fiber mats 400b in a "zig-zag" pattern relative to the machine direction 530b, as illustrated in FIG. 5. For example, the cross-lap directions 530a and 530b may have an equivalent relative angle, or the angles may be different.

In other embodiments, it is to be noted that the at least one superposed fibrous layer 400b may be superposed on the first fibrous layer 400a or vice versa. In another embodiment, two superposed fiber layers 400b may be superposed on the first fibrous layer 400a. The two superposed fibrous layers 400b may be superposed in opposing directions to one another, and superposed on one another with the first fibrous layer 400a being at the bottom. Alternatively, the machine fiber mats 400b or disposed in between the two cross-lapped fiber mats 400b.

In additional embodiments, more than two additional layers may be superposed with the first fibrous layer 400a before the needling step.

The first fibrous layer 400a and the at least one additional, superposed fibrous layer 400b are then sent to a second needling device which needles the fibrous layers 400a, 400b to create a first combined fibrous mat 500 referred to as a "02-roll-good" layer. The 02-roll good layer 500 may then be stored for further processing by being wrapped around another transportation bobbin 430 or laid down as a flat layered tape.

The second needling device may be a device such as the first needling apparatus. However, the density of needle punches on the second needling device is increased. In the preferred embodiment, the increased needle density at the 02-roll-good layer 500 allows increased transport of z-fiber bundles across the fiber mats 400a, 400b.

Figure 6A:
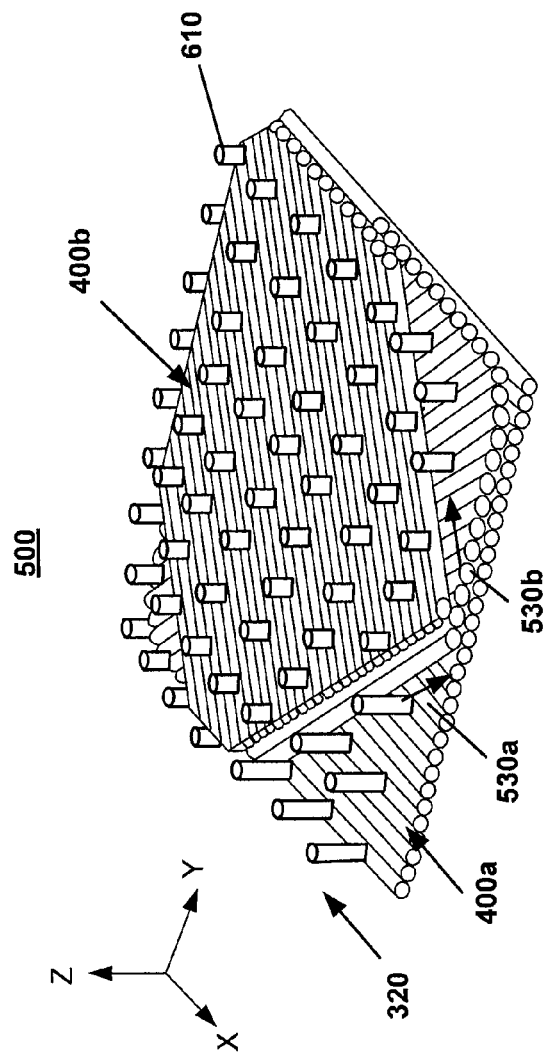
FIG. 6A illustrates a perspective view of a section of layers of fiber tows cross-lapped and needled with a process of the present invention.
Figure 6B:
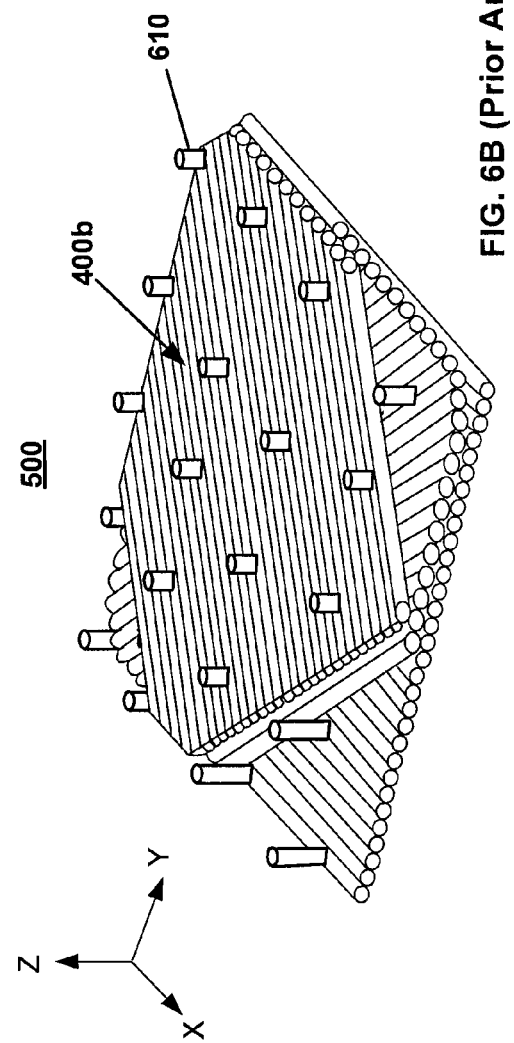
FIG. 6B illustrates a perspective view of a section of layers of fiber tows cross-lapped and needled with a process previously known in the art.

As illustrated in FIGS. 6A and 6B, increasing the number of needle punches breaks up more of the X and Y direction fibers of fiber mats 400a, 400b creating Z-fibers 610. FIG. 6B, illustrates needling by a needling device having an average saturation of needles. FIG. 6A, illustrates needling by a needling device having a increased amount of needle punches. Z-fibers 610 are needled in the Z direction by the needling-device, thereby interconnecting the fiber mats 400a, 400b in the Z direction. Increased interconnection in the Z direction at the 02-roll-good 500 may decrease delamination of the final preform.

In one embodiment, as illustrated in FIG. 6A, the increased needle density from the needling device is greater than approximately 55 needle punches per square centimeter. In another embodiment, as illustrated in FIG. 6A, the increased needle density from the needling device is greater than approximately 75 needle punches per square centimeter. In another embodiment, the increased needle density is between approximately 55 and 85 punches per square centimeter. In another embodiment, the increased needle density is between approximately 60 and 70 punches per square centimeter.

In one embodiment, the increased needle density is achieved by increasing the amount of needles 14 on the needling device. However, alternative methods of increasing the effective needle density are possible. In one alternative embodiment, the amount of needles 14 remains constant on the needling device as does the vertical velocity of the penetrating needles 14, but the speed with which the fibrous layers 400a, 400b move in the machine direction 520 under the needling apparatus 8 is decelerated. In this embodiment, a similar amount of needle punches per area may be obtained as increasing the number of needles 14 at a normal conveyor speed. Similarly, in an alternate embodiment, the vertical velocity of the penetrating needles 14 may be increased while maintaining the amount of needles 14 and the speed of the fibrous layers 400a, 400b in the machine direction 520 constant.

Figure 7:
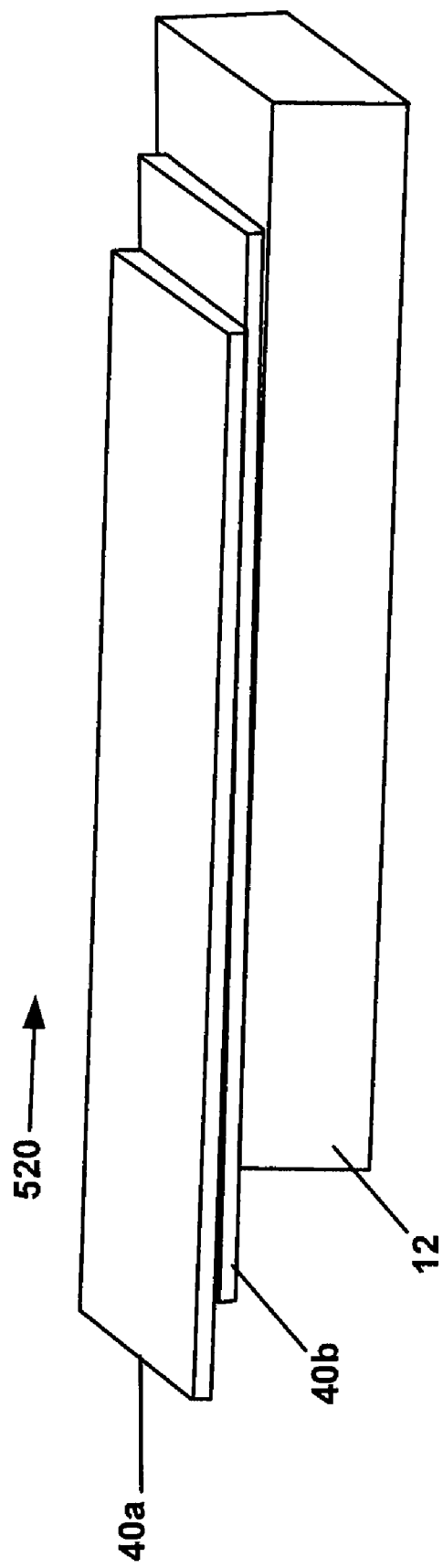
FIG. 7 illustrates a perspective view of a needling process of multiple fiber tows such as are manufactured in FIG. 5.

At block 350, the first combined fibrous mat, or 02-roll-good layer 500, is superposed with at least one additional combined fibrous mat, or 02-roll-good layer. These mats are then needled together to create a fibrous three dimensional structure, or "03-board" layer, as illustrated in FIG. 7. The 02-roll-good layers 500a and 500b are superposed on the support 12 and are needled together by a third needling device.

In one embodiment, for each needling pass, at least two combined fibrous mats, or 02-roll-good layers 40a, 40b are placed under the needling device. The 02-roll-good layers 40a, 40b are equivalent to the earlier illustrated 02-roll-good layer 500. In another embodiment, for each needling pass, the first combined fibrous mat (or-02-roll-good layer 40a) is superposed with at least two-additional combined fibrous mats. This allows for increased processing speeds of the material and decreases the amount of z-fibers 610 transported between layers.

Additionally, in certain embodiments, the third needling device has a decreased needle penetration density relative to an average needle density. In one embodiment, the decreased needle penetration density for the needling of the combined fibrous mats is less than approximately 60 needle punches per square centimeter. In another embodiment, the decreased needle penetration density is between approximately 40 and 60 punches per square centimeter. In another embodiment, the decreased needle penetration density is less than approximately 55 needle punches per square centimeter. In another embodiment, the decreased needle penetration density is between 40 and 55 punches per square centimeter.

Increased amounts of z-fibers 610 in the combined fibrous mats (02-roll-good layers) 40a, 40b facilitate decreased penetration density in the 03-needling process while preventing delamination in the final preform. Similar to the 02-roll-good layer, penetration density in the 03-board layer (i.e. fibrous three dimensional structure) may be decreased by decreasing the number of needles 14 on the needling device, decreasing the vertical speed of the needle device while maintaining the machine speed of the moving textile constant, or increasing the speed of the moving textile while maintaining the other parameters constant.

At block 360, combined fibrous mats (02-roll-good layers) 500 are continually superposed on support 12 to create a preform with a desired thickness. Multiple combined fibrous mats 500 can be needled together on one another to yield a partial preform 20. Two or more combined fibrous mats 500 needled with one another and having other combined fibrous mats 500 superposed onto them, may be designated as the partial preform 20. In a preferred embodiment, two combined fibrous mats 500 are added at the same time to the partial preform 20 and needled with one another and the partial preform 20. The needling speed during the needling process may be adjusted between high and low speeds to incrementally under-tack and over-tack the preform. Such incremental needling speeds, rather than a constant speed, may overcome variations in the preform material such as a non-uniform distribution of z-fibers 610. In a preferred embodiment, a high speed of needling at the 03-board layer ranges between 3 and 6 meters per minute. In a preferred embodiment, a low speed of needling at the 03 layer ranges between 2 and 4 meters per minute.

At block 370, the desired thickness of the preform is achieved and the final preform may be stored or shaped for further use. In one embodiment, the preform is sculpted by a cutting device to shape the final preform into an annular shape. In another embodiment, the preform is sculpted by a cutting device to shape the final preform into a circular shape. In another embodiment, the final preform may be sculpted into any shape as required for the use of the preform.

As noted, the double layer pull of the combined fibrous mats 500 may reduce the fabrication time of the final preform by as much as fifty percent over previously known single pull methods. In a preferred embodiment, the speed of the combined fibrous mats traveling through the needling device increases from 1.64 meters per minute to five meters per minute. In a preferred embodiment, the lower penetration density of the 03-board layers reduces the number of z-fibers 610 transported through the different layers. In one preferred embodiment, the annular shape final preform is utilized for brakes. In this embodiment, reduction of z-fibers 610 facilitates reduced heat transfer to the core of the brake disk, increased heat transfer to the ID/OD of the brake disk, and increased performance of the brake disk at high energy friction. Additionally, reduced z-fiber 610 content facilitates increased fiber volume in subsequent carbonization processing.

In one embodiment, the fibrous three dimensional structure comprises a ratio of z-fiber to in-plane fiber content of approximately 1:10 to 1:4. In another embodiment, the ratio is between approximately 1:8 to 1:5.

Not all of the depicted components may be required, however, and some implementations may include additional components not shown in the figures. Variations in the arrangement and type of the components may be made without departing from the spirit or scope of the claims as set forth herein. Additional, different or fewer components may be provided.

The illustrations described herein are intended to provide a general understanding of the structure of various embodiments. The illustrations are not intended to serve as a complete description of all of the elements and features of apparatus, devices, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for forming a fibrous three dimensional structure comprising:
    providing a first fibrous layer, wherein the first fibrous layer is aligned in the machine direction;
    superposing at least one additional fibrous layer with the first fibrous layer, wherein the direction of alignment of the at least one additional fibrous layer is at an acute angle to the machine direction;
    needling the first fibrous layer and the at least one additional fibrous layer together at a needle density of greater than approximately 55 needle punches per square centimeter, forming a first combined fibrous mat;
    superposing at least one additional combined fibrous mat with the first combined fibrous mat; and
    needling the first combined fibrous mat and the at least one additional fibrous mat at a needle density of less than approximately 60 needle punches per square centimeter, forming a fibrous three dimensional structure.

2. The method of claim 1 wherein the superposing of the at least one additional fibrous layer is performed by cross-lapping.

3. The method of claim 1 wherein the direction of alignment of the at least one additional fibrous layer is at an angle between approximately 30 and 70 degrees to the machine direction.

4. The method of claim 1 wherein the superposing comprises superposing at least two additional fibrous layers with the first fibrous layer at two separate acute angles to the machine direction.

5. The method of claim 1 wherein the first fibrous layer is needled prior to the superposing with the at least one additional fibrous layer.

6. The method of claim 1 wherein the needle density between the first fibrous layer and the at least one additional fibrous layer is greater than approximately 60 needle punches per square centimeter.

7. The method of claim 6 wherein the needle density between the first combined fibrous mat and the at least one additional combined fibrous mat is less than approximately 55 needle punches per square centimeter.

8. The method of claim 1 wherein the needle density between the first combined fibrous mat and the at least one additional combined fibrous mat is less than approximately 55 needle punches per square centimeter.

9. The method of claim 1 wherein the needle density between the first fibrous layer and the at least one additional fibrous layer is between approximately 60 and 70 needle punches per square centimeter, and wherein the needle density between the first combined fibrous mat and the at least one additional combined fibrous mat is between approximately 40 and 55 needle punches per square centimeter.

10. The method of claim 1 wherein the superposing of the at least one additional combined fibrous mat comprises superposing two combined fibrous mats.

11. The method of claim 1 wherein the superposing of the at least one additional combined fibrous mat comprises superposing at least three combined fibrous mats.

12. The method of claim 1 wherein the fibrous three dimensional structure comprises a ratio of z-fiber to in-plane fiber content of between approximately 1:10 and 1:4.

13. The method of claim 1 wherein the fibrous three dimensional structure comprises a ratio of z-fiber to in-plane fiber content of between approximately 1:8 and 1:5.

14. The method of claim 1 wherein the first fibrous layer comprises a tow of between approximately 24,000 and 400,000 fibrous filaments.

15. The method of claim 14 wherein the fibrous filaments are oxidized PAN fibers.

16. The method of claim 1 wherein the needling of the first combined fibrous mat and the at least one additional fibrous mat occurs at a needling speed of between approximately 2 and 6 meters per minute.

17. A method for forming a fibrous three dimensional structure comprising:
    forming a coherent first fibrous layer through at least one needling pass, wherein the first fibrous layer is aligned in the machine direction;
    cross-lapping a second fibrous layer with the first fibrous layer, wherein the direction of alignment of the second fibrous layer is at an angle between 30 and 70 degrees to the machine direction;
    needling the first fibrous layer and the second fibrous layer together at a needle density of approximately 60-70 needle punches per square centimeter, forming a first combined fibrous mat;
    superposing at least one additional combined fibrous mat with the first combined fibrous mat; and
    needling the first combined fibrous mat and the at least one additional fibrous mat at a needle density of approximately 40-55 needle punches per square centimeter, forming a fibrous three dimensional structure.

18. The method of claim 17 wherein the fibrous three dimensional structure comprises a ratio of z-fiber to in-plane fiber content of between approximately 1:8 and 1:5.

19. The method of claim 17 wherein the superposing of the at least one additional combined fibrous mat comprises superposing two combined fibrous mats.

* * * * *